US009390695B2

(12) United States Patent
Cartwright et al.

(10) Patent No.: US 9,390,695 B2
(45) Date of Patent: Jul. 12, 2016

(54) SYSTEMS, METHODS, AND APPARATUS TO SEARCH AUDIO SYNTHESIZERS USING VOCAL IMITATION

(71) Applicant: Northwestern University, Evanston, IL (US)

(72) Inventors: Mark B. Cartwright, Chicago, IL (US); Bryan A Pardo, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 0 days.

(21) Appl. No.: 14/924,294

(22) Filed: Oct. 27, 2015

(65) Prior Publication Data

US 2016/0133240 A1    May 12, 2016

Related U.S. Application Data

(60) Provisional application No. 62/068,801, filed on Oct. 27, 2014.

(51) Int. Cl.
*G10H 1/06* (2006.01)
*G10H 1/00* (2006.01)
(Continued)

(52) U.S. Cl.
CPC .......... *G10H 1/0008* (2013.01); *G06F 17/3053* (2013.01); *G06F 17/30743* (2013.01); *G10H 1/365* (2013.01); *G10H 1/366* (2013.01);
(Continued)

(58) Field of Classification Search
CPC ..... G10H 1/0008; G10H 1/365; G10H 1/366; G10H 2210/105; G10H 2220/106; G10H 2240/145; G10H 2250/615; G06F 17/30743; G06F 17/3053
USPC .................................................... 84/622, 659
See application file for complete search history.

(56) References Cited

U.S. PATENT DOCUMENTS 6,539,395 B1 *   3/2003   Gjerdingen ....... G06F 17/30743
6,593,936 B1 *   7/2003   Huang .............. G06F 17/30858
                                                       345/619

(Continued)

OTHER PUBLICATIONS

Ross Bencina, "The Metasurface—Applying Natural Neighbour Interpolation to TwotoMany Mapping", Proceedings of the 2005 International Conference on New Interfaces for Musical Expression (NIME05), Vancouver, BC, Canada, 2005, 4 pages.

(Continued)

*Primary Examiner* — Jeffrey Donels
(74) *Attorney, Agent, or Firm* — Hanley, Flight and Zimmerman, LLC

(57) ABSTRACT

Systems, methods, and apparatus for equalization preference learning are provided. An example method includes receiving an audio input with respect to a target sound. The example method includes extracting one or more features from the audio input to provide one or more examples for rating based on the audio input. The example method includes generating a query based on the audio input and the one or more rated examples. The example method includes providing one or more synthesizer suggestion results identified in a search based on the query. The example method includes evaluating the one or more results with respect to the target sound. When one of the results matches the target sound, the example method includes outputting synthesizer parameters associated with the result. When none of the results matches the target sound, the example method includes refining the query for a second search based on feedback with respect to the one or more results.

21 Claims, 8 Drawing Sheets

(51) Int. Cl.
G10H 1/36 (2006.01)
G06F 17/30 (2006.01)
(52) U.S. Cl.
CPC .... *G10H2210/105* (2013.01); *G10H 2220/106* (2013.01); *G10H 2240/145* (2013.01); *G10H 2250/615* (2013.01)

(56) References Cited

U.S. PATENT DOCUMENTS

| | | | | |
|---|---|---|---|---|
| 2007/0131094 A1* | 6/2007 | Kemp | ............... | G06F 17/30743 84/609 |
| 2009/0132077 A1* | 5/2009 | Fujihara | ............ | G06F 17/30743 700/94 |
| 2011/0154977 A1* | 6/2011 | Jeon | ..................... | G10H 1/0008 84/609 |
| 2011/0192272 A1* | 8/2011 | Usui | .................... | G10H 1/0008 84/622 |

OTHER PUBLICATIONS

Blancas et al., "Sound Retrieval from Voice Imitation Queries in Collaborative Database", AES 53rd International Conference, London, UK, Jan. 27-29, 2014, 6 pages.
Dahlstedt, "Evolution in Creative Sound Design", Evolutionary Computer Music, 2007, 21 pages.
Esling, "Multiobjective time series matching for audio classification and retrieval", IEEE Transactions on Speech Audio and Language Processing, 21(10):2057-2072, 2013, 16 pages.
Ethington et al., "Seawave: A system for musical timbre description", Computer Music Journal, 18(1):30-39, 1994, retrieved on Dec. 21, 2015, 11 pages.
Fasciani et al., "A voice interface for sound generators: adaptive and automatic mapping of gestures to sound", In Proceedings of NIME, 2012, 4 pages.
Garcia., "Growing sound synthesizers using evolutionary methods." In Proceedings of Workshop on Artificial Life Models for Musical Applications, 2001, 9 pages.
Heise et al, "Aurally and visually enhanced audio search with soundtorch", In Proceedings of International Conference Extended Abstracts on Human factors in Computing Systems, Apr. 4-9, 2009, 6 pages.
Horner et al., Machine Tongues XVI: Genetic algorithms and their application to FM matching synthesis. Computer Music Journal, 17(4):17-29, 1993, retrieved on Dec. 21, 2015, 14 pages.
Huang et al, "Active learning of intuitive control knobs for synthesizers using gaussian processes", In Proceedings of International Conference on Intelligent User Interfaces, Haifa, Israel, Feb. 24-27, 2014, 10 pages.
Johnson et al., "Timbre interfaces using adjectives and adverbs", In Proceedings of the 2006 International conference on New Interfaces for Musical Expression (NIME06), Paris, France, 2006, 2 pages.
Lemaitre, "On the effectiveness of vocal imitations and verbal descriptions of sounds",The Journal of the Acoustical Society of America, 135(2):862-873, 2014, 12 pages.
McLeod et al., "A smarter way to find pitch", In Proceedings of International Computer Music Conference, 2005, 4 pages.
Momeni, "Characterizing and Controlling Musical material Intuitively with Geometric Models", In Proceedings of the 2003 Conference on New Interfaces for Musical Expression (NIME-03), Montreal, Canada, 2003, 9 pages.
Mueller, "Dynamic time warping", In Information Retrieval for Music and Motion,Springer Berlin, Heidelberg, 2007, 16 pages.
Niennattrakul et al., "Shape averaging under time warping", In Proceedings of International Conference on Electrical Engineering/Electronics, Computer, Telecommunications and Information Technology, 2009, 4 pages.
Rui et al., "Optimizing learning in image retrieval", In Proceeding of IEEE Conference on Computer Vision and Pattern Recognition, vol. 1, pp. 236-243 vol. 1, 2000.
Stowell, "Making music through real-time voice timbre analysis: machine learning and timbral control", PhD thesis, School of Electronic Engineering and Computer Science, Queen Mary University of London, 2010, 204 pages.
Vertegaal et al., "Isee: An intuitive sound editing environment," Computer Music Journal, 18(2):21-29, 1994, retrieved on Dec. 21, 2015, 10 pages.
Peeters, "A large set of audio features for sound description (similarity and classification) in the cuidado project" Technical report, IRCAM, 2004, retrieved on Apr. 23, 2004, 25 pages.
D. L. Wessel.,"Timbre space as a musical control structure", Computer Music Journal, 3(2):45-52, Jun. 1979, retrieved on Dec. 21, 2015, 9 pages.
M. J. Yee-King., "Automatic sound synthesizer programming: techniques and applications" PhD thesis, University of Sussex, Jan. 2011, 180 pages.

\* cited by examiner

SYSTEMS, METHODS, AND APPARATUS TO SEARCH AUDIO SYNTHESIZERS USING VOCAL IMITATION

CROSS-REFERENCE TO RELATED APPLICATIONS

This patent claims priority to U.S. Provisional Application Ser. No. 62/068,801, entitled "SYSTEMS, METHODS, AND APPARATUS TO SEARCH AUDIO SYNTHESIZERS USING VOCAL IMITATION," which was filed on Oct. 27, 2014, and is hereby incorporated herein by reference in its entirety.

STATEMENT REGARDING FEDERALLY SPONSORED RESEARCH OR DEVELOPMENT

This invention was made with government support under grant numbers U.S. Pat. No. 1,116,384 and DGE-0824162 awarded by the National Science Foundation. The government has certain rights in the invention.

FIELD

The presently described technology generally relates to music and/or other audio production tools. In particular, the presently described technology relates to systems, methods, and apparatus for music and/or other audio production.

BACKGROUND

In recent decades, audio production tools have increased in performance and decreased in price. These trends have enabled an increasingly broad range of musicians, both professional and amateur, to use these tools to create music. Unfortunately, these tools are often complex and conceptualized in parameters that are unfamiliar to many users. As a result, potential users may be discouraged from using these tools, or may not use them to their fullest capacity.

As software-based synthesizers have become more advanced, their interfaces have become more complex and therefore harder to use. For example, Apple Inc.'s ES2 synthesizer has 125 controls, mostly consisting of knobs, buttons, and sliders. If those controls were simply binary switches, the control space would consist of $2^{125}$ (or $10^{38}$) possible combinations. Controls with more settings (e.g., knobs and sliders) allow even more combinations. Fully exploring such a large space of options is difficult. Compounding this problem is the fact that controls often refer to parameters whose meanings are unknown to most (e.g., an "LFO1Asym" parameter on Apple's ES2 synthesizer).

For many musicians, opacity of the controls, combined with a large number of possible combinations translates into an inability to actualize one's ideas. Even for experienced users, the tedium of these interfaces takes the users out of their creative flow state, thereby hampering productivity. Although simpler interfaces exist (e.g., Apple Inc.'s GarageBand), the simplicity of such interfaces is limiting to users. Existing simplified interfaces lack the flexibility of the complex interfaces, resulting in a small timbre palette constructed of a small number of factory presets, templates, and parameters with few creative options. Some manufacturers address this problem by having many, many presets (e.g., Native Instruments Kore Browser). However, searching through a vast number of presets can be a task as daunting as using a complex synthesizer.

Figure 1:
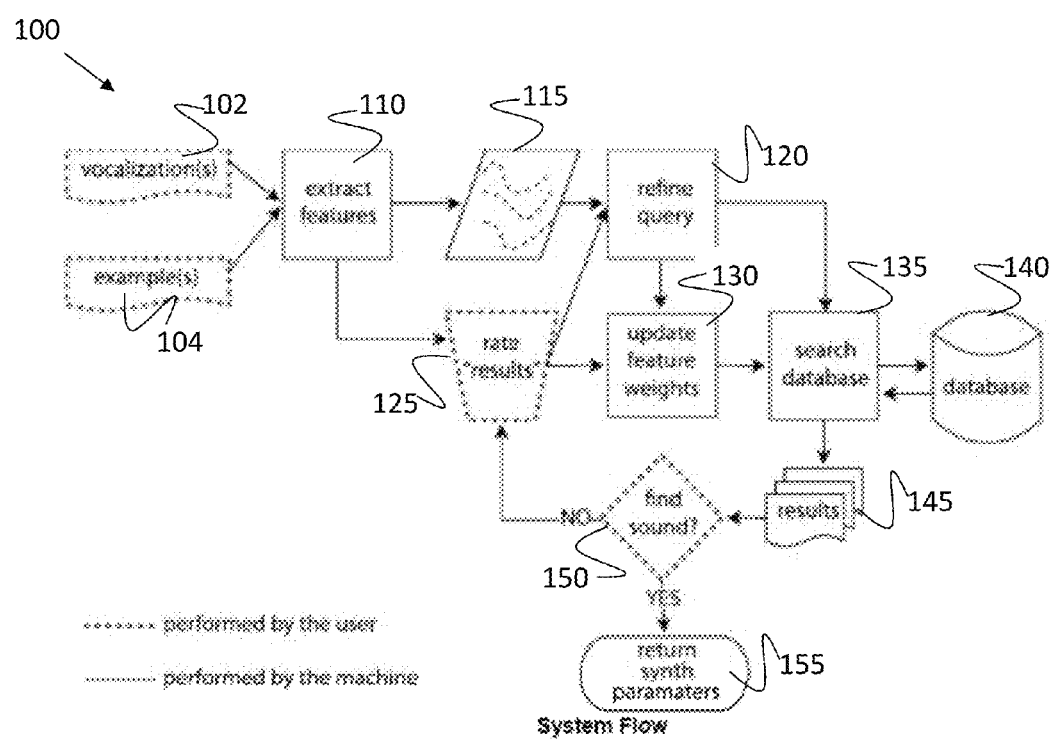
FIG. 1 illustrates an example synthesizer programming system and associated data flow.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF CERTAIN EMBODIMENTS

I. Brief Description

Certain examples provide methods and systems to improve speed and accuracy of synthesizer parameter identification and configuration. For example, systems, methods, and apparatus are provided to allow vocal imitation to be used for synthesizer parameter matching and configuration.

Potential users of audio tools (e.g., for tasks such as music production, hearing aids, etc.) are often discouraged by the complexity of an interface used to tune the device to produce a desired sound. The systems and methods learn settings by presenting a sequence of sounds to a user and correlating device parameter settings with the user's preference rating. Using this approach, the user rates roughly thirty sounds, for example.

Programming an audio synthesizer can be a difficult task for many. In order to communicate a desired sound to the synthesizer, a user must describe that sound using low-level, difficult-to-understand synthesis parameters. Novice users find that task so difficult that they often give up. Experienced users find that task tedious, taking them out of their creative flow. Certain examples provide systems and methods to interactively search a synthesis space of an audio synthesizer that takes an alternative, more natural approach in which the user describes his or her desired sound by imitating the sound with his or her voice and refining the imitation based on user feedback. Certain examples provide systems and methods to search through large databases of previously existing "factory presets" or to program a synthesizer using a data-driven approach to automatic synthesizer programming in which a database is populated with sample of the synthesis space. Certain examples provide systems and methods to represent and compare vocal imitations by accounting for strengths and limitations of the human voice.

Certain examples provide systems and methods to interactively assist a user to find a desired sound (e.g., a synthesizer patch) in a space of sounds generated by an audio synthesizer. A goal is to make synthesizers more accessible, letting users focus on high-level goals (e.g., "sounds brassy", etc.) instead of low-level controls (e.g., "What does the LFO1Asym knob do?", etc.). Certain examples provide a synthesizer assistant (e.g., referred to as "SynthAssist") that facilitates interaction and refinement as one might interact with a professional music producer or sound designer. For example, a user is prompted to imitate a desired outcome vocally (e.g., "make a sound that goes like <sound effect made vocally>", etc.). Some options are designed based on the vocal example, and the user provides evaluative feedback for the provided options (e.g., "that doesn't sound as good as the previous example.", etc.).

More specifically, in certain examples, a user can quickly and easily search through thousands of synthesizer sounds to find the desired option. The user first provides one or more soft examples (e.g., queries) that have some, but not all, of the characteristics of the desired sound. The soft examples can either be vocal imitations of the desired sound or existing recordings that are similar to the desired sound. Given these examples, SynthAssist guides the user in an interactive refinement process, where the system presents sounds for the user to rate. Based on these ratings, the system refines its estimate of the user's desired concept and learns which audio features are important to the user so that SynthAssist can present sounds that more closely match the desired concept. Such systems and methods can be used for other audio Query-By-Example (QBE) applications (e.g., searching through a sample or sound effects database, etc.), as well as for searching synthesizer and musical instrument sound databases.

Prior research related to the development of intuitive interfaces for audio synthesizers has sought to reduce the dimensionality of the synthesis parameter space by re-mapping controls to perceptual dimensions, high-level descriptive dimensions, exploratory maps, other timbral spaces, etc. Using interactive genetic algorithms that tune synthesis parameters, users can explore a synthesis space. However, while good for exploration, a number of evaluations required to program a specific desired sound using genetic algorithms is far too great to be completed by a human. Another approach is to have a computer compute a fitness function in an optimization algorithm. However, in these "tone matching" approaches, the user must provide an existing audio file of the exact desired sound, a requirement that may be difficult for the user to satisfy.

In certain examples, rather than requiring a user to communicate his/her desired synthesizer sound using low-level synthesis parameters or by searching through a database of presets with particular naming conventions, vocal imitation is provided as an intuitive way to communicate a desired synthesizer sound and program an audio synthesizer (also referred to as a "synth"). The vocal imitation is used to automatically search through a database of "preset" synthesizer sounds and/or other sound effects. Thus, a user can program an audio synthesizer using his or her voice and refining the synthesizer programming with evaluative user feedback. In certain examples, the user's voice is used when initially programming the synth but is not required when performing with the synth.

Certain examples facilitate synthesizer programming by first, accepting input from a user including one or more initial input examples captured by either recording a new sound (e.g., vocalize an example, etc.) or choosing a prerecorded sound. Then, the user rates how close each example is to a target sound. Based on the ratings, the system estimates the target sound. The system then generates suggestions from the synthesizer that are similar to the estimated target sound. The user rates how close the suggestions are to the desired target sound. If a suggestion is good enough, synthesizer parameters are returned. Otherwise, the process is repeated beginning with user rating of examples.

Certain examples provide a method including receiving an audio input with respect to a target sound. The example method includes providing one or more examples for rating based on the audio input. The example method includes generating a query based on the audio input and the one or more rated examples. The example method includes extracting one or more features from the audio input to provide one or more synthesizer suggestion results identified in a search based on the query. The example method includes evaluating the one or more results with respect to the target sound. When one of the results matches the target sound, the example method includes outputting synthesizer parameters associated with the result. When none of the results matches the target sound, the example method includes refining the query for a second search based on feedback with respect to the one or more results.

Certain examples provide a tangible computer readable storage medium including computer program code which, when executed by a processor, implements a method. The example method includes receiving an audio input with respect to a target sound. The example method includes providing one or more examples for rating based on the audio input. The example method includes generating a query based on the audio input and the one or more rated examples. The example method includes extracting one or more features from the audio input to provide one or more synthesizer suggestion results identified in a search based on the query. The example method includes evaluating the one or more results with respect to the target sound. When one of the results matches the target sound, the example method includes outputting synthesizer parameters associated with the result. When none of the results matches the target sound, the example method includes refining the query for a second search based on feedback with respect to the one or more results.

Certain examples provide a system including a processor configured to generate an interface, the interface receiving an audio input with respect to a target sound and providing one or more examples for rating based on the audio input. The example processor is configured to generate a query based on the audio input and the one or more rated examples. The example processor is configured to provide one or more synthesizer suggestion results identified in a search based on the query. The example processor is configured to evaluate the one or more results with respect to the target sound. When one of the results matches the target sound, the example processor is configured to output synthesizer parameters associated with the result. When none of the results matches the target sound, the example processor is configured to refine the query for a second search based on feedback with respect to the one or more results.

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components can be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, in at least one example, at least one of the elements is hereby expressly defined to include a tangible medium such as a memory, DVD, Blu-ray, CD, etc. storing the software and/or firmware.

II. Example Synthesizer Parameter Selection and Configuration Systems and Methods Certain examples provide methods and systems to describe audio concepts by formulating a synthesizer programming system as an interactive information retrieval system in which search keys in a database are compared to a query and ranked. FIG. 1 illustrates an example synthesizer programming system and associated data flow 100. The system 100 includes a feature extractor 110, a query refiner 120, a weighter 130, a searcher 135, a database 140, and an output 155. Components of the system 100 can be implemented in various combinations of hardware, software, and/or firmware.

The example synthesizer system 100 receives a vocalization 102 of a sound and/or one or more sound examples 104, and the feature extractor 110 extracts features from the vocalization(s) 102 and/or example(s) 104 to form an initial query 115 for a target sound. The feature extractor 110 uses one or more time series of audio features (e.g., absolute and/or relative audio features such as pitch, loudness, inharmonicity, clarity, spectral centroid, spectral spread, spectral kurtosis, etc., described further below) to analyze the input and form the initial query 115, for example. In an example, a 10-second vocalization in pulse-code modulation (PCM) format audio with a 32 kHz sampling rate may be split up into frames of 1024 samples with 512 samples of overlap, and, for each of the these frames, a discrete Fourier transform (DFT) is taken. The spectral centroid for that frame is calculated using the output of the DFT, $$X : spectralCentroid(X) = \frac{\sum_{n=0}^{1023} f(n)X(n)}{\sum_{n=0}^{1023} X(n)},$$

where n is the frequency index and f(n) is the frequency at index n. For this example, the time series including spectral centroids for each frame is retained, and the relative time series is also calculated by standardizing the time series (e.g., by subtracting the mean spectral centroid value from all elements in the time series, and dividing all elements in the time series by the standard deviation of the spectral centroid, etc.).

The initial query 115 is provided to the query refiner 120 for formation and/or refinement of the query based on the extracted features and/or additional feedback. The feature extractor 110 can also process examples 104 to rate results 125 and provide ratings to the query refiner 120. Rating can be used to mark irrelevant results and rate relevancy of remaining results, for example. Rating of results 125 and query refinement 120 are provided to the weighter 130 to update weight(s) associated with extracted features. For example, the user's ratings data returned from the user interface of the system for five results may be [0.2, irrelevant, 0.1, 0.9, irrelevant].

The searcher 135 uses refined queries and weighted features to search the database 140 to match synthesizer sound parameters to the queries and weighted features formed from the vocalization(s) 102 and/or example(s) 104. The searcher 135 processes one or more synthesizer samples in the database 140 using dynamic time warping and/or other distance function analysis, for example. The searcher 135 extracts result(s) 145 from the database 140 and analyzes 150 the result(s) 145 to determine whether the desired sound has been identified. Result(s) 145 can be played for the user so that the user can listen and rate the results 145 to identify how close or how far from the target sound the results 145 are. If a result 145 is a match for the target sound, then the output 155 returns corresponding synthesizer parameters. If no result 145 is a good enough match for the target sound (e.g., does not match an audible and/or distance function comparison to the desired sound, etc.), then additional results can be rated 125 (e.g., feedback provided to the system) and provided to refine the query 120 and/or update feature weights 130 for further searching 135 of the database 140.

Figure 2:
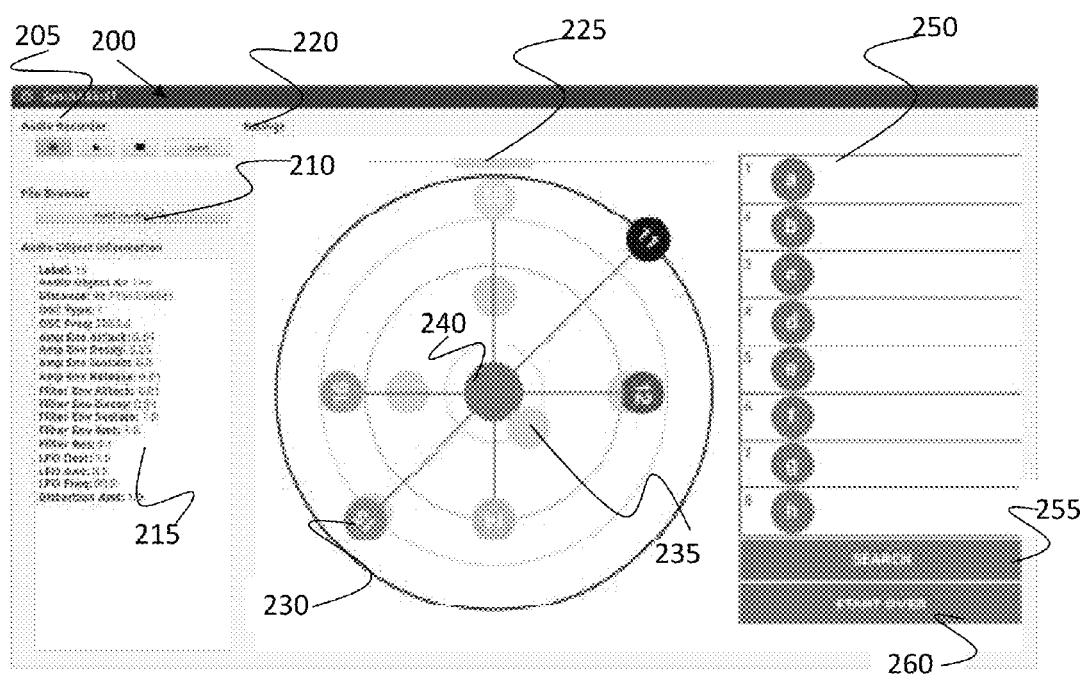
FIG. 2 shows an example SynthAssist user interface.

FIG. 2 shows an example user interface 200 to facilitate vocalization recording, example sound rating, output, etc. The example interface 200 includes an audio recorder 205, a file browser 210, an audio object information display panel 215, an interactive ratings display panel 220, and a results panel 240. The ratings area 220 includes a zoom slider 225 to navigate among a plurality of example sound ratings includes an indication of a result to rate 230 and a previous rating 235 with respect to a target hub 240.

As shown in FIG. 2, each suggestion is represented by a circle (e.g., a colored circle, a circle with an alphanumeric indication, etc.). When a user clicks on or otherwise selects a suggestion 230 and/or 235, an associated sound plays. In certain examples, synthesizer parameters can be changed to play the sound with a MIDI keyboard, etc. The user rates how similar suggestions are to the target 240 by moving the circles 230, 235 closer to or farther from the center "hub" 240. If the suggestion is irrelevant, the user can inform the system and remove the circle from the screen 220 (e.g., by double clicking on the circle, dragging the circle off of the rating area 220, etc.). The user plays a synth patch associated with a sound by either single clicking or moving (e.g., rating, etc.) a circle 230 and/or 235, for example. Dragging a suggestion indicator to the center 240 of the ratings area 220 indicates this is the desired sound and terminates the interaction between the system and the user via the interface 200, for example.

Top results 250 can be provided for review and selection. After results are rated, a search can be initiated 255 and/or the rating process started over 260, for example.

Example Query and Search Key Representation

A query is an example audio recording (e.g., a vocal imitation of a desired sound, or a recording of another synthesizer sound, etc.) provided to the synthesizer system 100 to guide search for a desired item (e.g., a synthesizer sound) from the database 140. Each item in the database 140 includes a sample (e.g., an audio recording), a patch (e.g., a set of synthesizer parameters (e.g., oscillator type, oscillator frequency, filter cutoff, etc.) used to create the sample), and a search key (e.g., an abstract representation of the sample's audio features (e.g., absolute and relative time series of high-level audio features such as pitch, spectral centroid, etc.)).

Certain examples support vocal imitation queries. While a human voice has a limited timbral range, the voice is very expressive with respect to how it can change in time. For example, a voice may not be able to exactly mimic a favorite Moog™ bass sound, but a human voice can mimic how the sound changes over the course of a note (e.g., change in pitch, loudness, brightness, noisiness, etc.).

In certain examples, audio (e.g., queries and samples in the database 140) is summed to mono and root-mean-squared (RMS)-normalized. In certain examples, features for search keys are extracted for the audio using a frame size of 1024 and a hop size of 512 at a sample rate of 32 kHz. Focusing on these changes through time for both queries and search keys, a time series of a small number of high-level features can be extracted from the audio including: pitch, loudness, inharmonicity, clarity, spectral centroid, spectral spread, and spectral kurtosis.

Pitch can be defined as a perceptual property of audio that allows an ordering of sounds on a frequency-related scale.

Loudness can be defined as a loudness associated with a Bark band (with an analogous value on the Hertz scale). Loudnesses can be summed to provide a total loudness value. A relative loudness can be determined by normalizing a specific Bark band loudness by the total loudness.

Inharmonicity can be defined as a divergence of a signal's spectral components from a purely harmonic signal. Inharmonicity can be computed as an energy weighted divergence of spectral components from a multiple of a fundamental frequency.

Clarity can be defined as is a measure of how "coherent a note sound is", is correlated to autocorrelation height.

A spectral centroid is a barycenter of a spectrum. The spectral centroid is computed by evaluating a spectrum as a distribution in which values are frequencies and probabilities to observe values are normalized amplitude. A spectral spread is a spread of the spectrum around its mean value. For example, the spectral spread can be defined as a variance of a spectral energy distribution. Spectral kurtosis provides a measure of the flatness of a distribution around its mean value. The kurtosis indicates a peakedness or flatness of the distribution.

Representations of these features can then augmented by also standardizing each feature with respect to itself (e.g., $$x_{std} = \frac{x - \mu_x}{\sigma_x},$$

where x is a time series and $\mu_x$ and $\sigma_x$ are a mean and variance of x) to capture relative change through time. Thus, feature(s) can be encoded in a plurality of ways. For example, a time-series of original feature values measured directly from digital audio can be encoded. Alternatively or in addition, a relative excursion of a feature from its long-term average can be encoded as measured in standard deviations, for example.

Figure 3A:
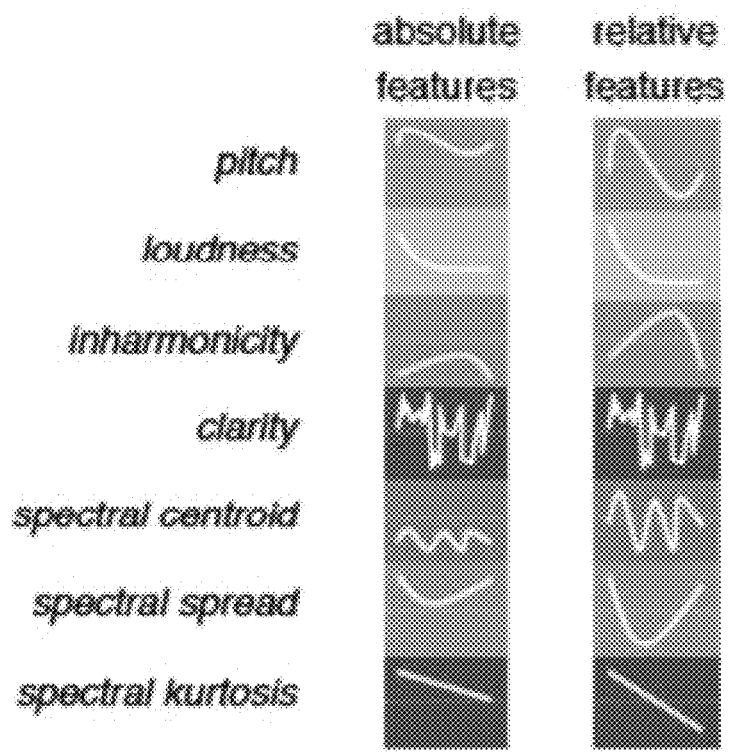
FIGS. 3A-3B illustrate example absolute and relative features for a sound.
Figure 3B:
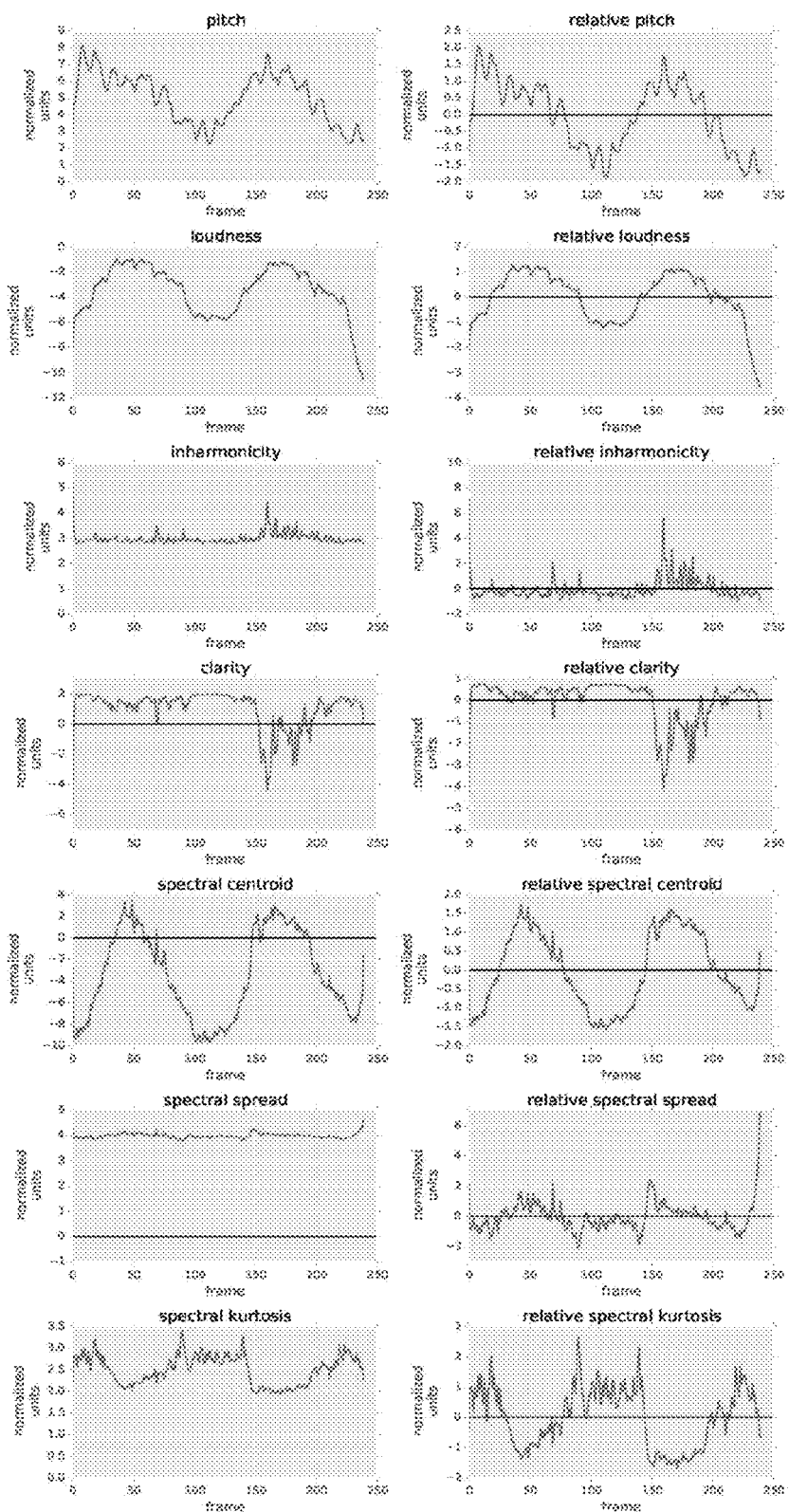

An example of absolute features versus relative features for each of pitch, loudness, inharmonicity, clarity, spectral centroid, spectral spread, and spectral kurtosis is shown in FIGS. 3A-3B with respect to a reference or center line. With respect to the "absolute" feature time series, measured values are provided. For the "relative" feature time series, the absolute time series values have been standardized to represent shift and scale invariant shape over time. As shown in more detail in the example of FIG. 3B, drawn from FIG. 3A, the right-hand column of relative values (e.g., relative pitch, relative loudness, relative inharmonicity, relative clarity, relative spectral centroid, relative spectral spread, and relative spectral kurtosis), represents a standardized time series, and the left-hand column represents the original features before standardization.

Thus, in the example of FIG. 3, each query and search key is represented as a plurality of time series, M (e.g., 14), one per feature divided among "absolute features" and "relative features" (e.g., 7 absolute features and 7 relative features corresponding to absolute pitch, absolute loudness, absolute inharmonicity, absolute clarity, absolute spectral centroid, absolute spectral spread, absolute spectral kurtosis and relative pitch, relative loudness, relative inharmonicity, relative clarity, relative spectral centroid, relative spectral spread, relative spectral kurtosis). A time series representation is retained to capture a temporal evolution of each sound (e.g., rather than characterizing the time series as a distribution or statistic/feature extraction). Each query or search key is represented as a matrix where each feature time series is a row of length N (e.g., $X=[x_1, \ldots x_M]^T \in R^{M \times N}$), where T indicates a transpose, and R represents a real number. Thus, M features sampled N times results in an M by N matrix of features collected from sampled audio. The example of FIG. 3B represents an example matrix in which each time series forms a row of the matrix.

Example Rank Calculation

To search the database 140, a distance from the query to each search key is calculated. However, query and keys may not be of the same length. Therefore, a distance measure is used based on an alignment cost in a dynamic-programming-based sequence alignment algorithm, such as dynamic time warping (DTW). Each feature time series is treated independently. Distance is calculated as follows:

$$D_{X,Y} = \sum_{i=1}^{M} w_i DTW(x_i, y_i), \qquad \text{(Equation 1)}$$

where i is an index of the features M (e.g., 14), X and Y are query and search key matrices, $x_i$ and $y_i$ are time series of an $i^{th}$ feature for the query and key, $w_i$, is a weighting coefficient of the $i^{th}$ feature, and $DTW(x_i,y_i)$ is a dynamic time warping distance between $x_i$ and $y_i$.

After calculating a distance for each key, the system 100 returns two sets of results: top results 250 and rating results 220. The first set, top results 250, includes a certain number (e.g., 8) of nearest neighbors in increasing order of the distance function in Equation 1. Initially, weighting coefficients, w, are equal, but after the first search round, weighting coefficients are refined such as described below. Therefore, the top results 250 may change each round.

Since the top results 250 may include many similar items, rating all of them may not provide much useful information. Therefore, the second set of results, rating results 220, includes examples 104 for rating by a user. The examples 104 for rating includes a nearest key that has not been rated yet and also keys that are nearest in each feature dimensions (e.g., the keys that were closest while just considering each feature distance, independently). This is a computationally efficient way of increasing the diversity of the results while also maintaining relevance. To avoid crowding the screen with too many results, a subset of keys is selected (e.g., 7 of 14 available feature keys are randomly selected). As shown in the example of FIG. 2, the rating results 220 appear as small colored circles 230, 235 radiating out of the "target hub" 240.

Example Relevance Feedback and Query Refinement

Once presented with one or more result sets (e.g., top results and rated results), the user can listen to the set(s) and can potentially select his or her desired synth example, thereby triggering the system to return corresponding parameters for the synthesizer. If a desired synth example is not in the results, however, the user can provide feedback to the system 100 to improve the search. To give feedback, the user marks (e.g., via the interface 200) which of the rating results are irrelevant (e.g., by double clicking to remove the results) and rates each remaining relevant result by moving the result closer to the center 240 (e.g., more relevant) or farther from the center 240 (e.g., less relevant) in the ratings 220 of the interface 200. Relevant results are added to a relevant set, Z.

The relevant set includes relevant examples for a current search session and initial examples 104 provided by the user, for example.

In certain examples, an initial estimate of a target concept is given by a query example. The target concept is then refined by creating a weighted average of a feature time series of relevant examples. Examples are weighted based on user-provided ratings, for example. In combining weighted examples, a resulting time series may include examples that are of potentially different lengths, since different synthesizer parameter settings can result in sounds of different lengths.

Figure 4:
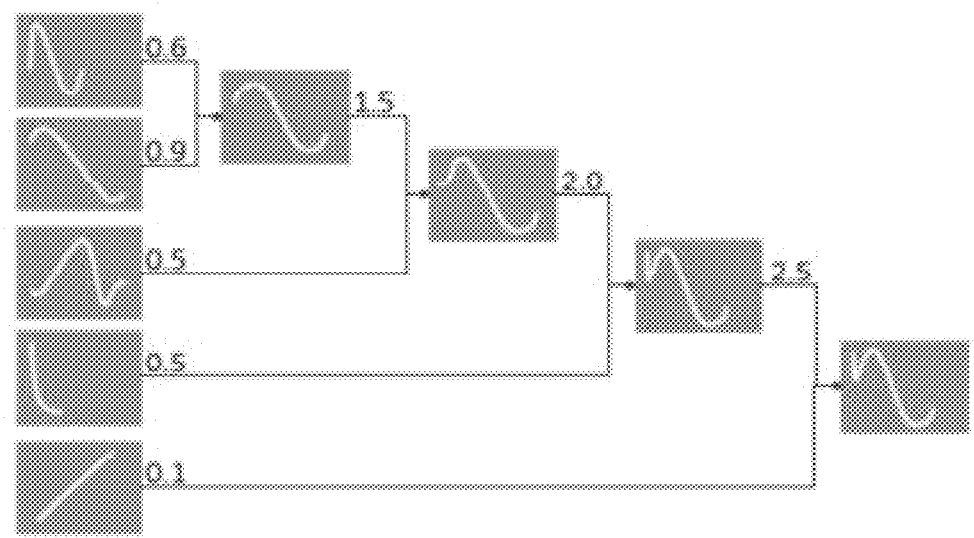
FIG. 4 illustrates an example tree-based clustering of values to provide a weighted average sound feature.

Dynamic time warping (DTW) can help accommodate sound examples of varying lengths. For example, Prioritized Shape Averaging (PSA) can be used to create a weighted average of the time series. To average many time series, PSA first performs agglomerative clustering (e.g., a type of hierarchical clustering that results in a binary tree) on the time series, using the DTW alignment cost as the distance function. PSA then aligns (e.g., using DTW) and averages pairs of time series from the bottom of the tree on up, weighted according to the user-provided rating. Thus, a DTW-class of sequence alignment algorithms can be used to align two sequences with an alignment cost based on a distance between the two sequences, and the DTW alignment cost can be used in PSA processing of the time series in a tree-based clustering. FIG. 4 illustrates an example tree-based clustering of values to provide a weighted average sound feature.

Treating each feature independently, the PSA method can be used to average the relevant time series for each feature. The resulting weighted average is a new estimate of the target concept, called a refined query X. In addition to refining the query, a distance metric is refined in response to the user's relevance feedback. For example, each of the examples presented to the user for rating is the closest one to the query along one of the M (e.g., 14) feature dimensions. To refine the weight w applied to each of the M features, a simple inverse standard deviation relevance feedback mechanism can be used (e.g., constrained to weight each feature dimension independently). However, since it is a time series, distance is calculated in a weighted variance function using DTW rather than a difference function. An example calculation of a distance function adapted from user feedback is as follows:

$$w_i = \left( \frac{1}{\sum_{k=1}^{|Z|} s_k} \sum_{k=1}^{|Z|} s_k DTW(y_i^k, \bar{x}_i)^2 \right)^{-\frac{1}{2}},$$ (Equation 2)

where $w_i$ is the weight of the $i^{th}$ feature, $s_k$ is the user's similarity rating, $y_i^k$ is the time series of the $i^{th}$ feature of the $k^{th}$ relevant example, $\bar{x}_i$ is the time series of the $i^{th}$ feature of the refined query, and Z represents a result set.

By allowing users to program audio synthesizers in a more natural, intuitive way, certain examples not only allow users to express themselves musically in ways they previously could not, but certain examples also make synthesizers more appealing to both existing and potential users/buyers.

Figure 5:
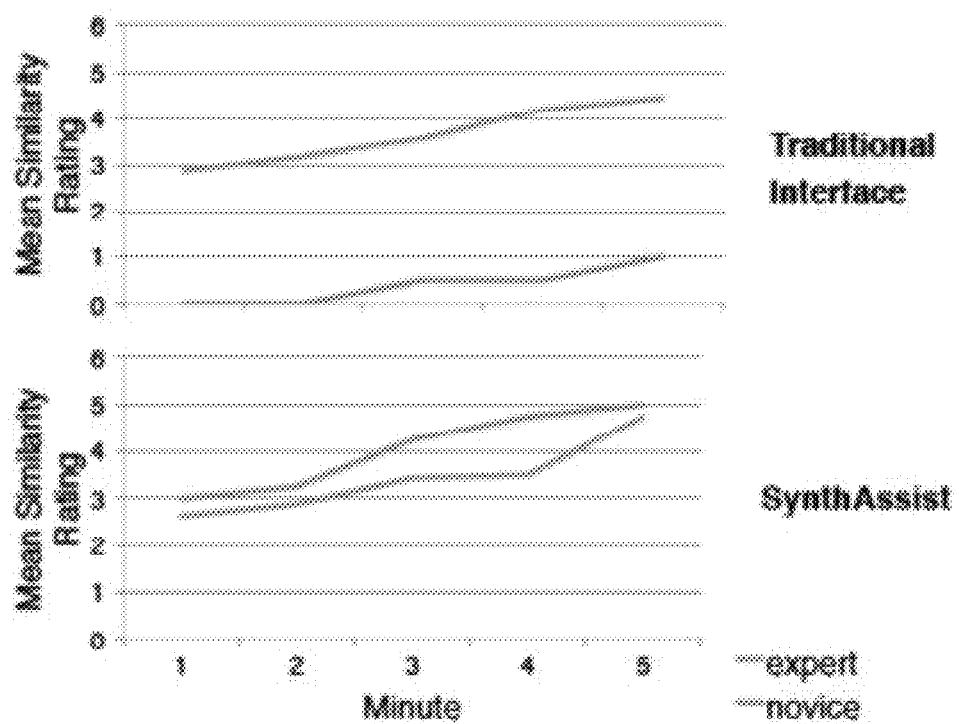
FIG. 5 illustrates an example comparison between a traditional interface and a SynthAssist interface.

FIG. 5 illustrates an example comparison between a traditional interface and a SynthAssist interface as disclosed and described herein. As shown in the example of FIG. 5, both a novice user without experience and an experienced user with many years (e.g., 13) of experience were evaluated to determine which user could find a specified sound faster given a 15-parameter synth and 10,000 samples in SynthAssist's database. Over four trials, each of the users was given a different target from the database and used each interface (traditional and SynthAssist) for five minutes to create a sound as close as possible to the target. Each user was asked to assess similarity of a best identified sound every minute, and results are shown in the example of FIG. 5, indicating that the expert and novice arrived at a much closer resulting using SynthAssist versus a traditional synthesizer interface.

Figure 6:
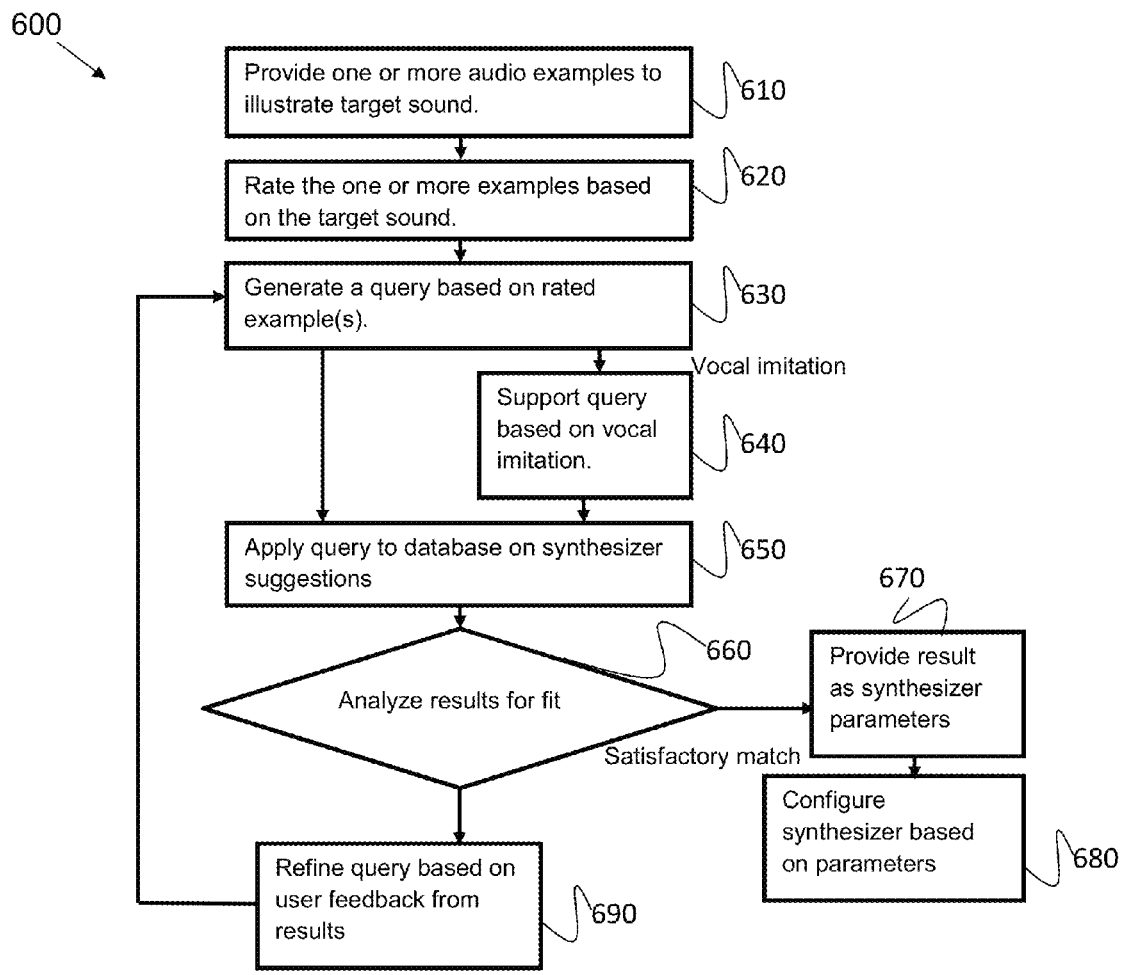
FIG. 6 illustrates a flow diagram of an example method to identify and configure a target synthesizer sound.

FIG. 6 illustrates a flow diagram of an example method 600 to identify and configure a target synthesizer sound. FIG. 6 depicts an example flow diagram representative of processes that can be implemented using, for example, computer readable instructions that can be used to facilitate listener calibration and audio output. The example processes of FIG. 6 can be performed using a processor, a controller and/or any other suitable processing device. For example, the example processes of FIG. 6 can be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIG. 6 can be implemented using coded instructions (e.g., computer readable instructions) stored on a non-transitory computer readable medium such as a flash memory, a read-only memory (ROM), a random-access memory (RAM), a CD, a DVD, a Blu-ray, a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 6 can be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 6 can be implemented manually or as any combination(s) of any of the foregoing techniques, for example, any combination of firmware, software, discrete logic and/or hardware. Further, although the example processes of FIG. 6 are described with reference to the flow diagram of FIG. 6, other methods of implementing the processes of FIG. 6 may be employed. For example, the order of execution of the blocks can be changed, and/or some of the blocks described may be changed, eliminated, sub-divided, or combined. Additionally, any or all of the example processes of FIG. 6 can be performed sequentially and/or in parallel by, for example, separate processing threads, processors, devices, discrete logic, circuits, etc.

At block 610, one or more audio examples are provided to illustrate a target sound. For example, an audio recording or a live vocalization of a desired sound can serve as an input to trigger the synthesizer configuration process.

At block 620, the one or more examples are rated to identify how far each example is from the target sound. For example, visual representations of the one or more audio examples may be provided for user selection via a user interface, and selection of an example triggers audio playback of the example. The user can then rate the example by assigning a value to the example through moving the example closer to or farther from the target sound at the center of the interface, assigning an alphanumeric value or indication to the example, etc.

At block 630, based on the one or more examples and ratings, a query is generated for a database of suggested synthesizer sounds.

At block 640, if the one or more examples included a vocal imitation, the query is supported based on key representations and distance functions that focus on how the vocal imitation sound changes over time. In certain examples, the distance function is adapted based on user feedback to emphasize audio features that the user cares about and deemphasize audio features that the user could not easily control in the vocal imitation query. The query can be refined based on the user feedback.

At block 650, the query is applied to the database. For example, one or more characteristics of the sound query are compared to samples in the synthesizer sound database to identify one or more results matching one or more characteristics of the query. DTW can be used to calculate a distance between the query and each retrieved sample from the database, for example.

At block 660, one or more results are provided from the database as a result of the query and are analyzed to determine whether one of the result(s) satisfies the query for the target sound. For example, one or more results can be played for the user and/or analyzed mathematically to determine a fit with the target sound. The user and/or algorithm can rate the result(s). At block 670, based on the ratings, if a result is a good enough match, the result is provided as one or more synthesizer parameters. At block 680, a synthesizer can be configured to reproduce the sound based on the provided parameter(s).

If, however, the result(s) do not include a satisfactory match, then, at block 690, user feedback regarding the rating of the result(s) is provided as input to refine the query of the database. At block 650, the refined query is provided to the database to generate one or more additional results and the process repeats with a more refined query to iteratively search and identify the target sound, as described above.

Thus, certain examples provide systems and methods to search a space of a synthesizer by querying a database of audio synthesizer patches using "soft-examples" (e.g., examples that have some but not all of the characteristics of a desired sound), such as vocal imitations, as input. To allow for such "soft examples" and account for limitations of the human voice, systems and methods leverage information regarding how perceptual audio features of sounds change over time, using both absolute and relative time series representations of features and a weighted dynamic time warping as a distance function. Query and feature weights are interactively refined through user-provided relevance feedback on search results. Using these systems and methods, a user needs to know what he or she is looking for, provide an initial example (e.g., using his or her voice to imitate the target sound), and be able to rate how similar example sounds are to the target sound.

Figure 7:
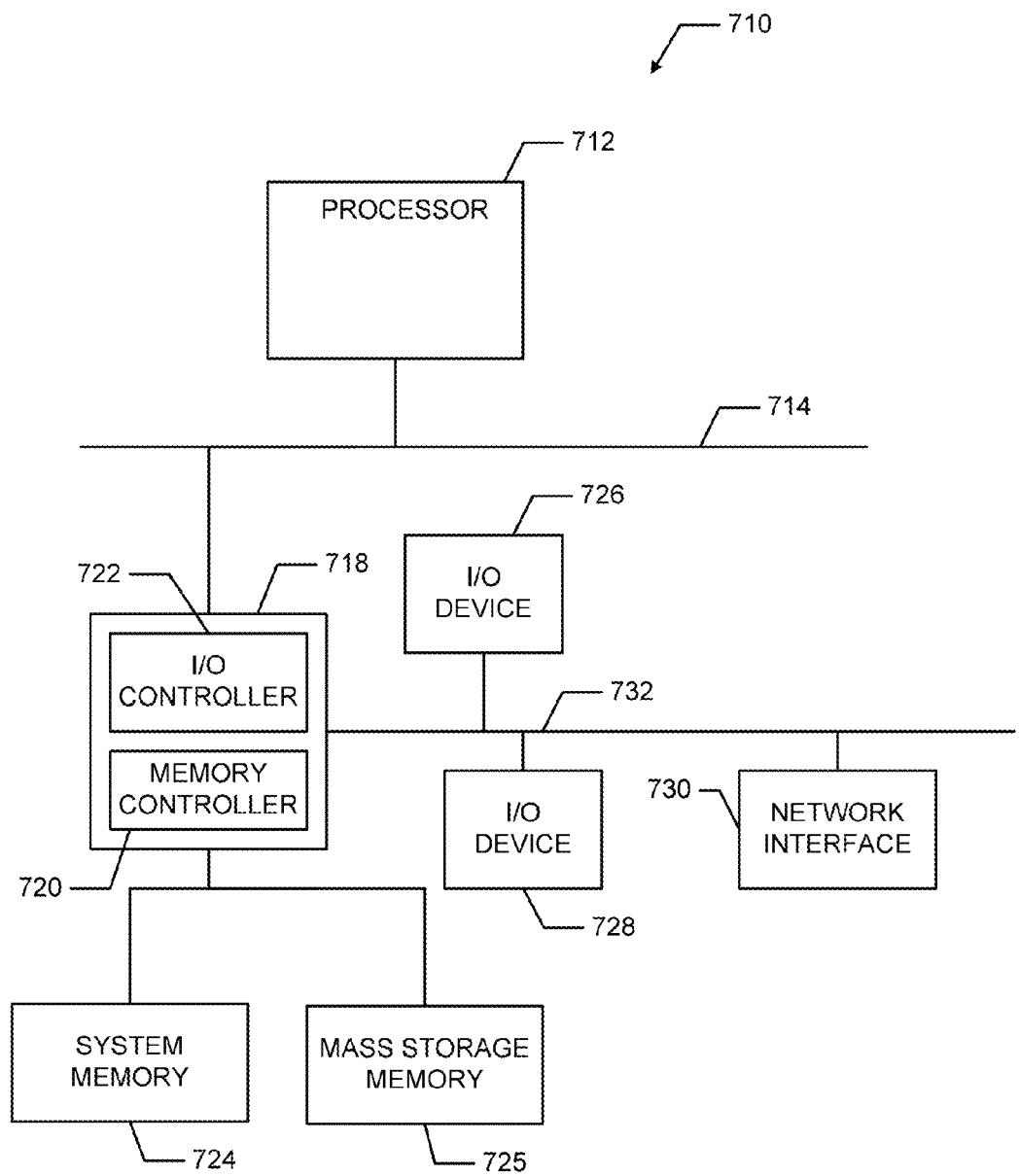
FIG. 7 is a block diagram of an example processor system that may be used to implement systems, apparatus, and methods described herein.

FIG. 7 is a block diagram of an example processor system 710 that may be used to implement systems, apparatus, and methods described herein. As shown in FIG. 7, the processor system 710 includes a processor 712 that is coupled to an interconnection bus 714. The processor 712 may be any suitable processor, processing unit, or microprocessor, for example. Although not shown in FIG. 7, the system 710 may be a multi-processor system and, thus, may include one or more additional processors that are identical or similar to the processor 712 and that are communicatively coupled to the interconnection bus 714.

The processor 712 of FIG. 7 is coupled to a chipset 718, which includes a memory controller 720 and an input/output ("I/O") controller 722. As is well known, a chipset typically provides I/O and memory management functions as well as a plurality of general purpose and/or special purpose registers, timers, etc. that are accessible or used by one or more processors coupled to the chipset 718. The memory controller 720 performs functions that enable the processor 712 (or processors if there are multiple processors) to access a system memory 724 and a mass storage memory 725.

The system memory 724 may include any desired type of volatile and/or nonvolatile memory such as, for example, static random access memory (SRAM), dynamic random access memory (DRAM), flash memory, read-only memory (ROM), etc. The mass storage memory 725 may include any desired type of mass storage device including hard disk drives, optical drives, tape storage devices, etc.

The I/O controller 722 performs functions that enable the processor 712 to communicate with peripheral input/output ("I/O") devices 726 and 728 and a network interface 730 via an I/O bus 732. The I/O devices 726 and 728 may be any desired type of I/O device such as, for example, a keyboard, a musical keyboard, a control surface, a video display or monitor, a mouse, etc. The network interface 730 may be, for example, an Ethernet device, an asynchronous transfer mode ("ATM") device, an 802.11 device, a DSL modem, a cable modem, a cellular modem, etc., that enables the processor system 710 to communicate with another processor system.

While the memory controller 720 and the I/O controller 722 are depicted in FIG. 7 as separate blocks within the chipset 718, the functions performed by these blocks may be integrated within a single semiconductor circuit or may be implemented using two or more separate integrated circuits.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

Some or all of the system, apparatus, and/or article of manufacture components described above, or parts thereof, can be implemented using instructions, code, and/or other software and/or firmware, etc. stored on a machine accessible or readable medium and executable by, for example, a processor system (e.g., the example processor system 710 of FIG. 7). When any of the appended claims are read to cover a purely software and/or firmware implementation, at least one of the components is hereby expressly defined to include a tangible medium such as a memory, DVD, CD, Blu-ray, etc. storing the software and/or firmware.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

One or more of the components of the systems and/or steps of the methods described above may be implemented alone or in combination in hardware, firmware, and/or as a set of instructions in software, for example. Certain embodiments may be provided as a set of instructions residing on a computer-readable medium, such as a memory, hard disk, Blu-ray, DVD, or CD, for execution on a general purpose computer or other processing device. Certain embodiments of the present invention may omit one or more of the method steps and/or perform the steps in a different order than the order listed. For example, some steps may not be performed in certain embodiments of the present invention. As a further example, certain steps may be performed in a different temporal order, including simultaneously, than listed above.

Certain embodiments include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of embodiments of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-executable instructions, data structures, program modules and other data for the computer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method comprising:
receiving an audio input with respect to a target sound;
extracting one or more features from the audio input to provide one or more examples for rating based on the audio input;
generating a query based on the audio input and the one or more rated examples;
providing one or more synthesizer suggestion results identified in a search based on the query;
evaluating the one or more results with respect to the target sound;
when one of the results matches the target sound, outputting synthesizer parameters associated with the result; and
when none of the results matches the target sound, refining the query for a second search based on feedback with respect to the one or more results.

2. The method of claim 1, wherein the one or more examples are rated by moving graphical representations of each example with respect to a representation of the target sound via a graphical user interface.

3. The method of claim 1, wherein the audio input comprises a vocal imitation of the target sound.

4. The method of claim 1, wherein the audio input comprises an audio recording of the target sound.

5. The method of claim 1, wherein the query is generated based on a weighted average of a feature time series of one or more relevant examples from the one or more rated examples.

6. The method of claim 1, wherein providing one or more synthesizer suggestion results identified in a search based on the query further comprises evaluating the query with respect to a plurality of synthesizer suggestion results based on a distance function.

7. The method of claim 6, wherein the distance function is determined based on dynamic time warping.

8. The method of claim 1, wherein the query is generated based on one or more features includes pitch, loudness, inharmonicity, clarity, spectral centroid, spectral spread, and spectral kurtosis.

9. The method of claim 8, wherein the one or more features include one or more absolute features and one or more relative features.

10. A tangible computer readable storage medium including computer program code which, when executed by a processor, implements a method comprising:
receiving an audio input with respect to a target sound;
extracting one or more features from the audio input to provide one or more examples for rating based on the audio input;
generating a query based on the audio input and the one or more rated examples;
providing one or more synthesizer suggestion results identified in a search based on the query;

evaluating the one or more results with respect to the target sound;

when one of the results matches the target sound, outputting synthesizer parameters associated with the result; and when none of the results matches the target sound, refining the query for a second search based on feedback with respect to the one or more results.

11. The computer readable storage medium of claim 10, wherein the audio input comprises at least one of a vocal imitation of the target sound and an audio recording of the target sound.

12. The computer readable storage medium of claim 10, wherein the query is generated based on a weighted average of a feature time series of one or more relevant examples from the one or more rated examples.

13. The computer readable storage medium of claim 10, wherein providing one or more synthesizer suggestion results identified in a search based on the query further comprises evaluating the query with respect to a plurality of synthesizer suggestion results based on a distance function.

14. The computer readable storage medium of claim 13, wherein the distance function is determined based on dynamic time warping.

15. The computer readable storage medium of claim 10, wherein the query is generated based on one or more features includes pitch, loudness, inharmonicity, clarity, spectral centroid, spectral spread, and spectral kurtosis.

16. A system comprising:
a processor configured to generate an interface, the interface receiving an audio input with respect to a target sound and providing one or more examples for rating based on the audio input, the processor configured to:
generate a query based on the audio input and the one or more rated examples;
provide one or more synthesizer suggestion results identified in a search based on the query;
evaluate the one or more results with respect to the target sound;
when one of the results matches the target sound, output synthesizer parameters associated with the result; and
when none of the results matches the target sound, refine the query for a second search based on feedback with respect to the one or more results.

17. The system of claim 16, wherein the audio input comprises at least one of a vocal imitation of the target sound and an audio recording of the target sound.

18. The system of claim 16, wherein the query is generated based on a weighted average of a feature time series of one or more relevant examples from the one or more rated examples.

19. The system of claim 16, wherein providing one or more synthesizer suggestion results identified in a search based on the query further comprises evaluating the query with respect to a plurality of synthesizer suggestion results based on a distance function.

20. The system of claim 19, wherein the distance function is determined based on dynamic time warping.

21. The system of claim 16, wherein the query is generated based on one or more features includes pitch, loudness, inharmonicity, clarity, spectral centroid, spectral spread, and spectral kurtosis.

* * * * *